United States Patent [19]

Kim

[11] Patent Number: 5,228,128
[45] Date of Patent: Jul. 13, 1993

[54] PERSONAL COMPUTER FACSIMILE DEVICE

[75] Inventor: Deok-Su Kim, Suwon, Rep. of Korea

[73] Assignee: SamSung Electronics Co., Ltd., Suwon, Rep. of Korea

[21] Appl. No.: 454,998

[22] Filed: Dec. 22, 1989

[30] Foreign Application Priority Data

Mar. 31, 1989 [KR] Rep. of Korea ................. 1989-4176

[51] Int. Cl.⁵ .............................................. G06F 15/00
[52] U.S. Cl. .................. 395/275; 364/919.1; 364/DIG. 2; 358/442
[58] Field of Search ............ 395/275, 725, 325; 364/900 MS File, 919.1, DIG. 2; 358/442, 443, 468

[56] References Cited

U.S. PATENT DOCUMENTS

| | | | |
|---|---|---|---|
| 4,710,951 | 12/1987 | Ilezono | 358/468 |
| 4,916,607 | 4/1990 | Teraichi et al. | 364/200 |
| 4,922,348 | 5/1990 | Gillon et al. | 358/442 |
| 4,947,345 | 8/1990 | Paradise et al. | 358/442 |
| 4,964,154 | 10/1990 | Shimotono | 358/442 |
| 4,991,200 | 2/1991 | Lin | 358/442 |
| 5,008,926 | 4/1991 | Misholi | 379/89 |
| 5,041,918 | 8/1991 | Ishida et al. | 358/442 |

Primary Examiner—Michael R. Fleming
Assistant Examiner—Glenn A. Auve
Attorney, Agent, or Firm—Robert E. Bushnell

[57] ABSTRACT

A facsimile communication device capable of facilitating communication through the public telephone networks between at least tow personal computer facsimile is disclosed in the specification. The personal computer facsimile device is able to transmit a document or a picture directly to and receive it directly from another facsimile device. Also, the personal computer facsimile device is designed so as not to encroach on the other party's function when a command is given either by the facsimile or by the personal computer of the other party.

28 Claims, 2 Drawing Sheets

PERSONAL COMPUTER FACSIMILE DEVICE

BACKGROUND OF THE INVENTION

The present invention relates to a facsimile communication device and, in particular to an information exchange device for a personal computer (hereinafter referred to as PC) facsimile.

In a general configuration for a facsimile shown in FIG. 1, a document to be transmitted is read into a scanner 41 and compressed coded in a central processing unit (CPU) and driver circuit 43 and, after being modulated through a modem of the facsimile (fax modem) 44, the data are transmitted to another party's facsimile through a line interface 45. In case of a document received, a signal coming in through a fax modem 44 is modulated and changed into a digital signal. Then, the digital signal is decoded in the central processing unit and drive circuit 43 and printed through a printer 42.

Facsimile type communication through public telephone networks can be achieved not only between two facsimile machines, describe above, but also between a PC facsimile and a facsimile. In data communication between a conventional PC facsimile and another facsimile, data is sent to the central processing unit of a facsimile from the PC via a PC interface. The central processing unit of the facsimile receives data continuously, so the CPU of the PC is unable to perform other functions. Effectively, the PC is controlled by the PC interface. Similarly, when the central processing unit of a facsimile sends data to the PC, the PC is unable to perform other functions but must wait for specified commands from the PC interface.

As is evident from the above discussion, when either the central processing unit of the facsimile or the PC sends data to another party, the user of the PC is unable to otherwise use the PC since the PC must be entirely dedicated to the facsimile function.

BRIEF SUMMARY OF THE INVENTION

Accordingly, an object of the present invention is to provide a personal computer facsimile device which is able to transmit a document or a picture directly to and receive it directly from another facsimile device.

Another object of the present invention is to provide a personal computer facsimile device which does not encroach on the user's operation of the personal computer when data is sent either by the facsimile or by the personal computer to the other party.

According to an aspect of the invention, the inventive PC facsimile device includes: address buffering circuitry for extending fan-out of address buses accessing a personal computer expansion slot and a facsimile central processing unit; data buffers for extending the fan-out of data buses accessing the personal computer expansion slot and the facsimile central processing unit; control signal generating circuitry for generating a control signal controlling a system and a local system; an interrupt driving circuit for enabling the personal computer expansion slot and the facsimile central processing unit to process an interrupt condition; an output port for designating the condition of each part of the system and the local system required by the personal computer expansion slot and the facsimile central processing unit; an input port for storing the condition generated in each part of the system and the local system and enabling the personal computer expansion slot and the facsimile central processing unit to adjust the condition properly; address counting and designating circuitry for designating an address in response to the address provided by the address buffer circuitry; a driving device, driven by the control of the facsimile CPU, for controlling time management of each part of local system so as to read or write quickly; interfacing circuitry for exchanging information by both storing and generating the data as designated by the personal computer expansion slot and the facsimile CPU; a memory for storing all the programs and data required by the local system; audio signal detecting circuitry for sensing input/output audio signals, optimizing those signals, and receiving and detecting ring signals; a facsimile modem device for selecting one input signal from between a dial-up modem data access arrangement device and a facsimile data access arrangement device which performs modulation and demodulation of data in conjunction with the facsimile of the other party and connecting the input signal selected by the audio signal detecting circuitry and driving the analog signals which are input/output from this audio signal detecting circuitry into transmitting and receiving signals; a serial input/output port for receiving communication data of the personal computer expansion slot in parallel and generating the data in series in a given device, and receiving other data in series from the given device and generating the data to the personal computer expansion slot in parallel; and a dial-up modem for selecting the data input/output of the interfacing circuitry or dial-up modem and exchanging the data with the serial input/output port and separately processing data by dividing the analog signals of the dial-up modem data access arrangement device into transmitting and receiving signals.

BRIEF DESCRIPTION OF THE DRAWINGS

For a better understanding of the invention and to show how the same may be carried into effect, reference will now be made, by way of example, to the accompanying diagrammatic drawings, in which.

DETAIL DESCRIPTION OF THE INVENTION

An embodiment of the present invention will now be explained hereinbelow with reference to the drawings attached hereto.

Figure 1:
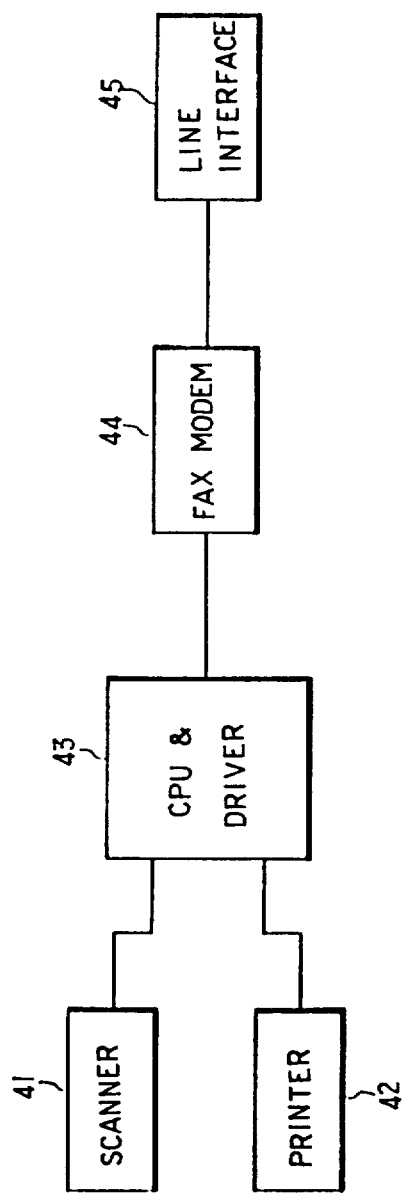
FIG. 1 is a prior art circuit diagram.
Figure 2:
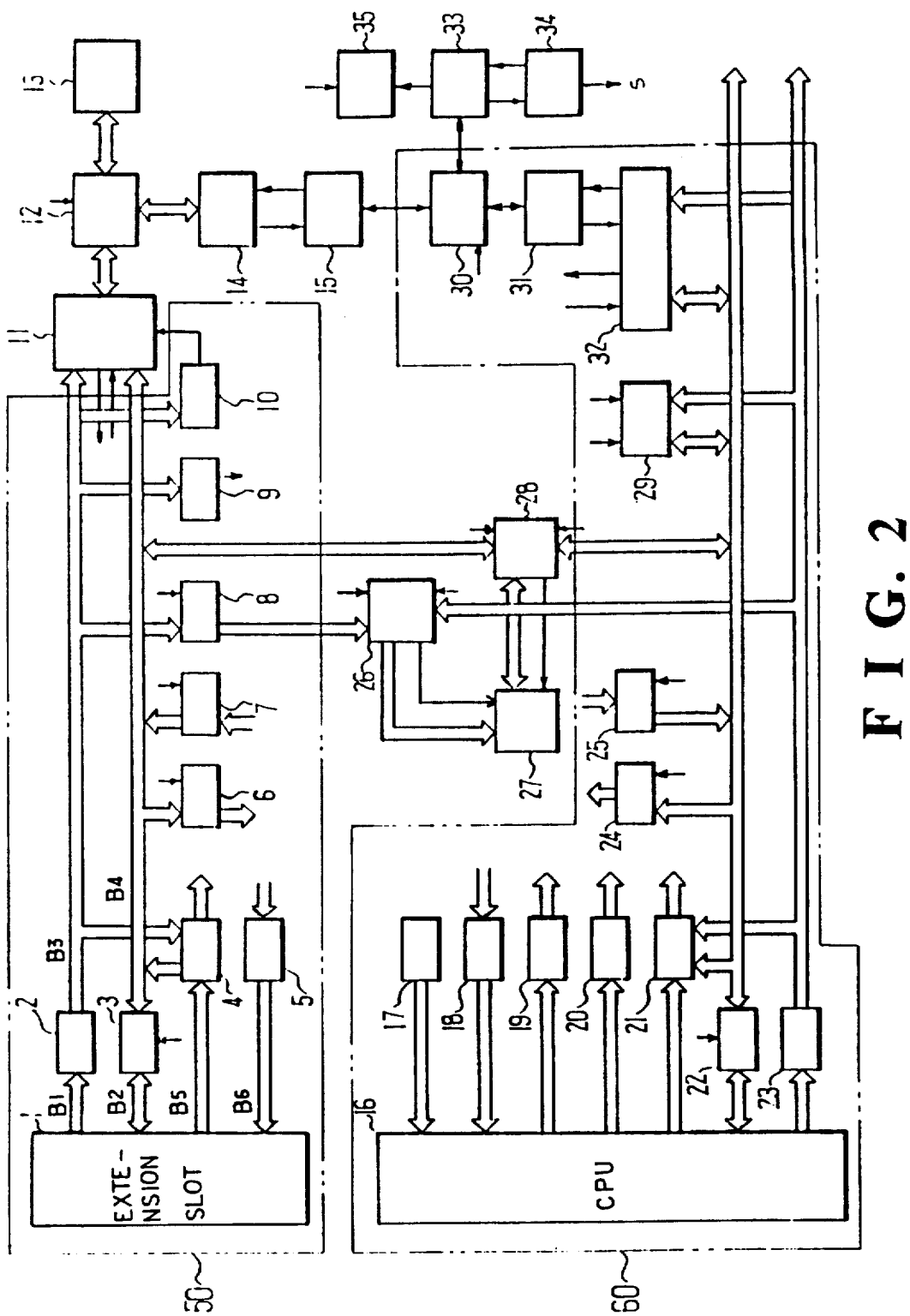
FIG. 2 is a circuit diagram of the present invention.

Referring to FIG. 2 showing a circuit diagram of the present invention, a built-in PC expansion, extension, slot 1 inputs/outputs addresses B1, data B2, a control signal B5 and an interrupt signal B6 which are required for the expansion of the communication board and memory. A first address buffer 2, connected to the PC expansion slot 1, extends the fan-out of addresses input from the PC expansion slot 1. A first data buffer 3, connected to the PC expansion slot 1, extends the fan-out of the data bus. A first control signal generator 4 generates a control signal required for each part of the system 50. A first interrupt driver 5 delivers the interrupt condition generated in each part of the system 50 to the PC expansion slot 1 and enables the PC expansion slot 1 to process the interrupt condition. A first output port 6 designates the condition in each part of the system 50 and enables the PC expansion slot 1 to adjust it properly. The address counter and designation section 8 designates an address from the addresses B3 provided by the first address buffer 2. An input/output selector 9 is used to extend the PC function of the PC expansion slot 1. A port selector 10 selects a communication channel of the PC. A system 50, comprised of the above devices, controls the overall functions.

Also provided is a serial input/output port 11 which receives parallel communication data from the PC expansion slot 1 and outputs this data in series to a later-described dial-up modem selector 12. Additionally, the serial input/output port 11 receives data in series from the dial-up modem selector 12 and provides the data in parallel to the PC expansion slot 1. The dial-up modem selector 12 selectively connects the serial input/output port 11 to either a first interface circuit 13 or dial-up modem 14. The first interface circuit 13 enables a hard wire link via a RS-232C-type connector with another computer. The first dial-up modem 14 modulates and demodulates data to allow communication with another party's dial-up modem. A dial-up modem data access arrangement (DAA) 15 divides analog signals into signals to be transmitted and received signals and appropriately processes each of these signals separately.

A facsimile central processing unit (CPU) 16 enables each part of a local system 60 to operate inaccordance with a control program. A facsimile CPU driver 17 is driven by the control of the facsimile CPU 16. A second interrupt driver 18 delivers the interrupt condition generated in each part of the local system 60 to the facsimile CPU 16 and enables this facsimile CPU 16 to process the interrupt condition. A direct memory access (DMA) driver 19 reads or writes to or from each memory quickly. A timer driver 20 controls the time management of each part of the local system 60. A second control signal generator 21 generates a control signal required for each part of the local system 60. A second data buffer 22 extends the fan-out of a data bus from the facsimile CPU 16. A second address buffer 23 extends the fan-out of an address bus from the facsimile CPU 16.

A second output port 24 designates the condition of each part of the local system 60 required for the facsimile CPU 16. A second input port 25 stores the condition generated in each part of the local system 60 enabling control by the facsimile CPU. A memory 29 stores all the programs and data required by the local system 60 and exchanges the data with the other devices. An analog signal selector 30 selectively connects the dial-up modem DAA 15 or a facsimile data access arrangement (DAA) 31 to a line interface 33. A facsimile modem 32 provides analog data signals to and receives data signals from the facsimile DAA 31 which the modem 32 separately processes.

An address multiplexer 26 controls a port memory 27 and is designated by an address counter and designation section 8. A port memory 27 exchanges information between the PC expansion slot 1 and facsimile CPU 16 while both storing and outputting data. A data multiplexer 28 delivers to the port memory 27 or inputs therefrom 27 the data which is designated respectively by the PC expansion slot 1 and facsimile CPU 16. A line interface 33 optimizes the inputted/outputted audio signals while adjusting the electric property with a part interfaced with telephone exchanging system (not illustrated). A ring signal detector 34 is to receive a ring signal by sensing it when it comes in, while sensing the audio signals of the line interface 33, and a speaker and speaker driver line interface 33 to the user through a speaker.

The following is a detailed explanation of the present invention with reference to the drawings attached hereto.

In a PC starting and program storing operation, a program is stored in the memory 29 from the PC after the PC is started. In order to quickly read or write the data of memory 29 and of any other memory, the DMA driver 19 is connected to the facsimile CPU 16.

The method by which programs are stored into the memory 29 is that: first, an address is designated in the PC expansion slot 1 through the first address buffer 2 and the address counter and designation device 8, and then data is transmitted through the first data buffer 3. This address is stored in the port memory 27 through the address multiplexer 26 and then data is stored through the data multiplexer 28. When a signal indicating that storage has been completed is received by the facsimile CPU 16 through the first output port 6, the facsimile CPU 16 moves the data stored in the port memory 27 to the memory 29 through address multiplexer 26 and data multiplexer 28. Then a signal, indicating that the movement has been completed, is transmitted from the second output port 24 to the PC expansion slot 1 through the first input port 7. Therefore, a required amount of program data is moved using the storage method of PC expansion slot 1 and the moving method of the facsimile CPU 16. When the program is loaded in memory 29 as described above, the host CPU of PC expansion slot 1 and the facsimile CPU 16 can perform different programs in dependently of each other. Except when the data file is moved, the facsimile CPU and the host CPU do not interfere with each other.

Various kinds of control signals and interrupt conditions are generated in the above movements in the first and second control signal generators 4, 21 and in the first and second interrupt drivers 5, 18. The input/output selector 9 promotes the efficiency of the PC and can be set up for the convenience of the user in order to avoid the collision of input/output data with another PC function expansion board.

Referring to facsimile data transmission, a basic facsimile protocol is established in order to communicate with the other party through the facsimile DAA (Data Access Arrangement) 31, analog signal selector 30, line interface 33 and the facsimile modem 32.

When the protocol is established, the facsimile CPU 16 commands the movement of a file to be transmitted to the PC expansion slot 1. The command is provided through the second output port 24 and the first input port 7. The PC expansion slot 1 transfers the data in the port memory 27 to the memory 29. The file is then transferred in regular order to the facsimile modem 32 by the facsimile CPU 16 for transmission. When transmission is finished, the PC expansion slot 1 keeps the facsimile modem 32, the facsimile DAA 31, the analog signal selector 30, and the line interface 33, in a standby state. Thereafter, the facsimile CPU 16 manages the required data and sends a transmission-ending signal to the PC expansion slot 1. At the same time, it stores data in the port memory 27, through the second data buffer 22 and the second address buffer 33 and via address multiplexor 26 and data multiplexer 28, and then informs the PC expansion slot 1 through the second input port 24 and the first input port 7. In the PC expansion slot 1, all transmissions come to an end when the data of the port memory 27 is stored on the disk of the PC, itself, by reversing the program loading order.

As for facsimile data receiving, first, detection of a ring signal on the line interface 33 by the ring signal detector 34 occurs after which a control signal 'S' is transmitted the facsimile CPU 16 through the interrupt driver 18. When the facsimile CPU 16 detects the control signal 'S', the facsimile modem 32, the facsimile DAA 31, the analog signal selector 30, and the line interface 33 are enabled to receive and communicate the protocol with the facsimile of the other party. When the protocol is established with the other party, the facsimile CPU 16 receives facsimile data through the line interface 33, facsimile DAA 31 and facsimile modem 32 which is then stored in the port memory 27, through the address multiplexor 26 and data multiplexor 28. When the port memory 27 is filled with data, the facsimile CPU 16 delivers a transfer command signal to the PC expansion slot 1, through the second output port 24 and the first input port 7.

The PC expansion slot 1 stores the contents of the port memory 27 onto a disk in the PC itself through the address counter and designation section 8, address multiplexor 26 and data multiplexor 28, upon the transfer command signal given by the facsimile CPU 16. When storing is finished, the facsimile CPU 16 is informed through the first output port 6 and the second input port 25. Even while the PC expansion slot 1 transfers the contents of the port memory 27, however, the facsimile CPU 16 stores the data coming in from the facsimile modem 32, in the memory 29. Once the transfer has been completed, data is stored into the port memory 27 as before. When reception comes to an end, it places the facsimile modem 32, the facsimile DAA 31, the analog signal selector 30, and line interface 33, to initial conditions. Then, the facsimile CPU 16 manages the required data and communicates to the PC expansion slot that reception is finished. Once the data to be managed by the PC expansion slot 1 after the communication, operation of receiving a message is brought to a finish.

The dial-up modem transmission 14 and reception operation differs from the facsimile modem operation. The dial-up modem 14 transmits a text files such as ASCII to a dial-up modem of another party or receives the same therefrom. The dial-up modem operation is performed by the PC expansion slot 1 independently of the facsimile CPU 1. In the event that a ring is detected by the ring signal detector 34 and received or transmitted as required by user, the analog signal selector 30 and the final-up modem selector 12 are made to select a dial-up modem operation mode. After data are provided by the dial-up modem 14 through the analog signal selector 30 and the dial-up modem DAA 15, the data are delivered to the PC expansion slot 1 through the dial-up modem selector 12 and serial input/output prot 11, and then stored on the disk of the PC itself.

On the other hand, a file to be transmitted is processed by the dial-up modem 14, through the serial input/output 11 and dial-up modem selector 12, and next to the line interface 33, through the dial-up modem DAA 15 and analog signal selector 30. Here, the speaker and speaker driver provide an indication of the data movement by providing the interlaced transmitted/received signals audibly to the user when it moves in the dial-up modem or in the facsimile modem mode, namely, when the facsimile receives and transmits a message, or when a next file is transmitted and received.

The RS-232C is provided to facilitate additional functions of the present invention. It is used at the convenience of the user to allow transfer of various data with the PC expansion slot 1, through the first interface 13, dial-up modem selector 12, and serial input/output 11, after the dial-up modem selector 12 has been placed into a RS-232 mode.

As described herein above, the present invention is advantageous in that it can transmit a document or a picture without distortion, as it transits information like a document or a picture by means of PC to the facsimile of the other party directly from within the PC, and that it is multifunctional and convenient to use, as it does not interfere with drive of the other party when a command is given either from the facsimile or from the PC.

While the invention has been particularly shown and described with reference to a preferred embodiment, it will be understood by those skilled in the art that modifications in detail may be made without departing from the spirit and scope of the invention.

What is claimed is:

1. A personal computer facsimile device comprising a first system having a personal computer expansion slot and a local system having a facsimile central processing unit, said device comprising:

address buffering means for extending fan-out of address buses from said personal computer expansion slot and said facsimile central processing unit;

data buffering means for extending fan-out of data buses from said personal computer expansion slot and said facsimile central processing unit;

control signal generating means, connected to said personal computer expansion slot, for generating a control signal for the first system and the local system;

interrupt driving means, connected to said personal computer expansion slot, for enabling said personal computer expansion slot and said facsimile central processing unit to process interrupt conditions;

an output port for designating a condition of parts of the first system and local system required by said personal computer expansion slot and said facsimile central processing unit;

an input port for storing the condition of the parts of the first system and local system, and for enabling said personal computer expansion slot and said facsimile central processing unit to adjust the condition;

address counting and designating means for designating an individual address in dependence upon addresses received from said address buffering means;

driving means, driven by the facsimile control processing unit, for controlling time management of said parts of said local system;

interfacing means for storing data received from said data buffering means according to said addresses received from said address buffering means to enable exchange of said data between said personal computer expansion slot and said facsimile central processing unit;

memory means for storing programs and data for the local system;

audio signal detecting means for sensing received audio signals and ring signals;

facsimile modem means for performing modulation and demodulation of data received from the data buses of said local system and received data to be provided to said data buses of said local system;

a serial input/output port for receiving communication data of the personal computer expansion slot via said data buses of said expansion slot in parallel and providing the communication data in series, and for receiving other data in series from external sources and providing said other data to the data buses of the personal computer expansion slot in parallel; and a dial-up modem for receiving the communication data and exchanging the communication data with said serial input/output port and separately processing the communication data for transmission.

2. The personal computer facsimile device according to claim 1, wherein said interfacing means comprises:

port memory means for both storing and exchanging the data between said personal computer expansion slot and said facsimile central processing unit;

address multiplexing means for controlling said port memory by delivering addresses thereto as designated by the personal computer expansion slot and the facsimile central processing unit; and data multiplexing means for delivering to said port memory the data designated respectively by said personal computer expansion slot and said facsimile central processing unit.

3. The personal computer facsimile device according to claim 1, wherein said audio signal detecting means is interfaced with a telephone exchanging system and comprises:

line interfacing means for optimizing the audio signals received from the telephone exchanging system; and ring signal detecting means for sensing the audio signals of said line interfacing means and recognizing ring signals; and a speaker and speaker driving means for directly confirming exchange of the audio signals audibly through said speaker.

4. The personal computer facsimile device according to claim 1, wherein said facsimile modem means comprises:

a facsimile modem unit for modulating and demodulating data;

analog signal selecting means for selectively connecting a line interface with said dial-up modem; and facsimile data access arrangement means for dividing analog signals inputted/outputted from said analog signal selecting means into transmitting and receiving signals and communicating said analog signals with said facsimile modem unit.

5. The personal computer facsimile device according to claim 1, wherein said dial-up modem comprises:

an interface circuit;

a dial-up modem unit for processing data;

dial-up modem selecting means for selecting data input-output of said interface circuit and said dial-up modem unit for exchange with said serial input/output port; and dial-up modem data access arrangement means for dividing analog signals into transmitting and receiving signals and separately processing said transmitting and receiving signals.

6. The personal computer facsimile device according to claim 1, wherein said device further comprises an input/output selector for extension of personal computer functions.

7. The personal computer facsimile device according to claim 1, wherein said device further comprises a port selector selecting personal computer communication channels.

8. A personal computer facsimile device comprising:

a personal computer expansion slot;

a facsimile central processing unit;

interfacing means for exchanging information between said personal computer expansion slot and said facsimile central processing unit, and for facilitating the exchange of the information by temporarily storing the information;

memory means for storing programs and data for said personal computer facsimile device;

facsimile modem means for transmitting and receiving facsimile signals under control of said facsimile central processing unit, wherein said facsimile signals are representative of documents and pictures;

dial-up modem means for transmitting and receiving modem signals, wherein said modem signals are representative of a text file;

audio signal interfacing means for exchanging the facsimile signals and the modem signals with a telephone network; and analog signal selecting means for exchanging the facsimile signals between the audio signal interfacing means and said facsimile modem means and for exchanging the modem signals between the audio signal interfacing means and said dial-up modem means.

9. A personal computer facsimile device according to claim 8, wherein said interfacing means comprises:

port memory means for storing and outputting the information for exchange between said personal computer expansion slot and said facsimile central processing unit;

address multiplexing means for delivering addresses to said port memory means as designated by said personal computer expansion slot and said facsimile central processing unit; and data multiplexing means for delivering data to said port memory means as designated by said personal computer expansion slot and said facsimile central processing unit.

10. A personal computer facsimile device according to claim 8, wherein said audio signal interfacing means comprises:

line interfacing means for optimizing the first audio signals and the second audio signals and a connection with the telephone network; and ring signal detecting means for recognizing ring signals applied to said line interfacing means.

11. A personal computer facsimile device according to claim 10, wherein said audio signal interfacing means further comprises:

a speaker; and speaker driving means for directly confirming the facsimile signals and the modem signals exchanged in said line interfacing means by sending an audible signal to a user through said speaker.

12. A personal computer facsimile device according to claim 8, wherein said facsimile modem means comprises:

a facsimile modem unit for modulating and demodulating the facsimile signals; and facsimile data access arrangement means for dividing the facsimile signals into transmitting and receiving signals.

13. A personal computer facsimile device according to claim 8, wherein said dial-up modem means comprises:

a dial-up modem unit for modulating and demodulating modem signals; and dial-up modem data access arrangement means for dividing the modem signals into transmitting and receiving signals.

14. A personal computer facsimile device according to claim 8, further comprising:
a first interface; and
dial-up modem selecting means for selecting input from either said dial-up modem means and said first interface.

15. A personal computer facsimile device according to claim 8, further comprising input/output selecting means for extending personal computer functions.

16. A personal computer facsimile device according to claim 8, further comprising port selecting means for selecting personal computer communication channels.

17. A method of program storing for a personal computer facsimile device, said method comprising the steps of:
transmitting an address from a personal computer extension slot to interfacing means;
transmitting data from the personal computer extension slot to the interfacing means;
storing the address and data in the interfacing means until a signal indicating that storage is finished is sent from the personal computer extension slot to a facsimile central processing unit;
transferring the address and the data stored in the interfacing means to a facsimile memory; and
repeating said steps of transmitting an address, transmitting data, storing the address and data and transferring the address and the data stored until a signal indicating that movement is finished is sent from a facsimile central processing unit.

18. A method of facsimile data transmission for a personal computer facsimile device, said method comprising the steps of:
creating a basic facsimile protocol;
transferring data to be transmitted from interface means to facsimile memory means;
transmitting the data through facsimile modem means;
managing and storing data in interface means; and
transferring the data from the interface means to a disk of a personal computer.

19. A method of facsimile data receiving for a personal computer facsimile device, comprising the steps of:
detecting a ring signal;
receiving a protocol;
receiving facsimile data;
storing the facsimile data in an interface;
transferring the facsimile data from the interface to a disk of a personal computer;
storing additional data in a facsimile modem at a same time that data is being transferred from the interface to the personal computer;
transferring the additional data to the interface; and
repeating steps of transferring the facsimile data, storing additional data, and transferring the additional data until facsimile receiving ends.

20. A computer facsimile device, comprising:
first address buses for connection to a personal computer expansion slot, and for providing first addresses to and from said personal computer expansion slot;
first data buses for connection to said personal computer expansion slot, and for providing first data to and from said personal computer expansion slot;
a facsimile central processor;
second address buses for providing second addresses to and from said facsimile central processor;
second data buses for providing second data to and from said facsimile central processor;
facsimile modem means for receiving and demodulating transmitted data received from a line interface, for providing the transmitted data as said second data to said second data buses, and for receiving and modulating said second data to be transmitted on said line interface; and
interfacing means for providing a connection between said first address buses and said second address buses to exchange addresses between said first address buses and said second address buses, and for providing a connection between said first data buses and said second data buses to exchange data therebetween.

21. A computer facsimile device as claimed in claim 20, wherein said interfacing means comprises:
a port memory for storing said second data received from said second data buses; and
an address multiplexing means for addressing said port memory selectively in response to one of said first addresses and said second addresses.

22. A computer facsimile device as claimed in claim 21, further comprising a facsimile memory, addressed by said second addresses, for storing said second data.

23. A computer facsimile device as claimed in claim 22, wherein said second data provided by said facsimile modem means is written selectively into one of said port memory and said facsimile memory.

24. A computer facsimile device as claimed in claim 20, further comprising dial-up modem means for modulating said first data received from said first data buses, and for demodulating said transmitted data received from said line interface and providing the demodulated data as said first data to said first data buses.

25. A computer facsimile device as claimed in claim 24, further comprising a serial input/output port for converting said first data transferred between said first data buses and said dial-up modem means between a serial and parallel format.

26. A computer facsimile device as claimed in claim 25, further comprising:
an interface circuit for providing said first data as serial output data; and
a dial-up modem selector for selectively coupling one of said dial-up modem means and said interface circuit to said serial input/output port.

27. A method for transferring facsimile data between a personal computer facsimile device and a host computer, said method comprising:
receiving, demodulating, and then providing said facsimile data to a port memory for storage therein via a first data bus; and
periodically transferring said facsimile data stored in said port memory to a second data bus connected to an expansion slot of said host computer so as to require control by said host computer only during said transferring.

28. A method as claimed in claim 27, further comprising storing said facsimile data received during said transferring in a buffering memory of said personal computer facsimile device and then providing said facsimile data stored in said buffering memory to said port memory after completion of said transferring.

* * * * *

UNITED STATES PATENT AND TRADEMARK OFFICE
CERTIFICATE OF CORRECTION

PATENT NO. : 5,228,128
DATED : July 13, 1993
INVENTOR(S) : Deok-Su Kim

It is certified that error appears in the above-indentified patent and that said Letters Patent is hereby corrected as shown below:

Column 3,

Line 24,     replace "inaccordance" to "in accordance--;

Column 4,

Line 30,     replace "in dependently" with --independently--;

Line 63,     replace "multiplexor" with --multiplexer--;

Column 5,

Line 14,     replace "multiplexor" with --multiplexer-- (both occurrences);

Line 22,     replace "multiplexor" with --multiplexer-- (both occurrences);

Line 53,     replace "prot" with --port--;

Signed and Sealed this

Ninth Day of August, 1994

*Attest:*

BRUCE LEHMAN

*Attesting Officer*      *Commissioner of Patents and Trademarks*